April 12, 1938. C. W. HULL ET AL 2,113,789
RELEASABLE FASTENER
Filed May 1, 1935
Fig-1
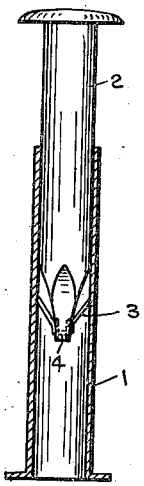
Fig-2
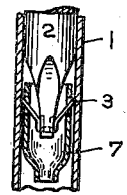
Fig-3
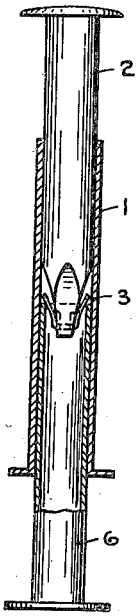
Fig-4
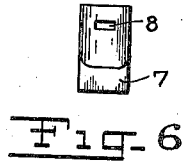
Fig-6
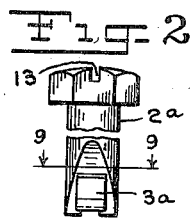
Fig-5
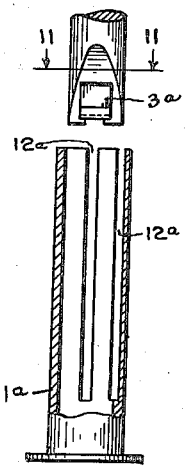
Fig-8
Fig-10
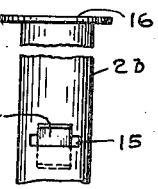
Fig-12
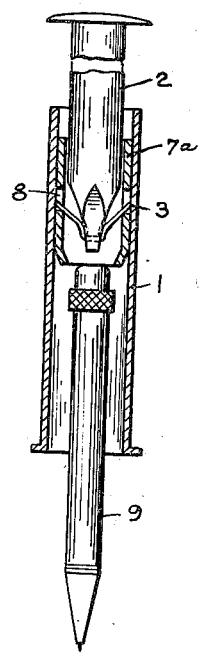
Fig-7
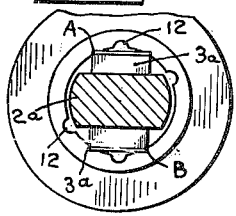
Fig-9 Fig-11
Fig-13
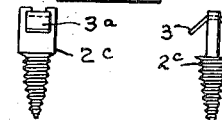
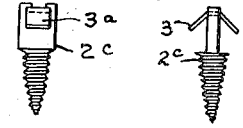
Fig-14 Fig-15
INVENTORS
Charles W. Hull
BY John C. Hamill
Chas. W. Hull
ATTORNEY.

Patented Apr. 12, 1938

2,113,789

UNITED STATES PATENT OFFICE 2,113,789

RELEASABLE FASTENER

Charles W. Hull, Westfield, N. J., and John C. Hamill, Laurelton, Long Island, N. Y.

Application May 1, 1935, Serial No. 19,164

3 Claims. (Cl. 85—4)

The present improvements relate, in general to securing means for uniting elements in fixed relation with respect to one another and more particularly to sectional members adapted to be telescoped for providing a temporary or permanent union.

A primary object of the improvements is to provide a novel combination of parts, adapted to be disposed within one another, having an improved coupling member for locking the parts together. A further object is to provide a novel means for disengaging, releasably locked parts of the type illustrated.

Another object is to simplify the method and means for disengaging releasably locked telescoped members, and to reduce manufacturing costs of such elements.

The improvements are directed, in general, to coupled objects which require a key or other specially made release means. This expedient may detract from the appeal of such articles due to the cost of manufacture and to the fact that the key is frequently mislaid or lost, causing inconvenience and waste of time. It is therefore also an object of the present improvements, to provide a method and/or means for affording disengagement of coupled members without the necessity of employing any particular implement. In certain embodiments of the invention, a simple tube may be employed, in others, a pencil, nail or other elongated object, and in others, no implement at all need be resorted to.

Another object is to provide a novel coupling structure for male members in combination with sleeve or female members having interior walls of slightly softer materials so that the free ends of the coupling member may embed themselves therein for effecting a grip.

A further object is to provide a novel screw member in combination with the present improvements.

Other objects include improvements upon the form of device described and claimed in the patent to John C. Hamill, No. 1,958,852, dated May 15, 1934, and will be apparent to those skilled in the art upon reference to the accompanying specification and drawing in which—

Fig. 1 is a perspective view of the pin or post member showing one form of the novel coupling member;

Fig. 2 is a sectional view of the coupled parts, with the coupling member minutely embedded in the sleeve wall;

Fig. 3 is a fragmentary view of the pin of Fig. 1;

Fig. 4 is a sectional view similar to Fig. 2 showing a tube in the act of releasing the parts;

Fig. 5 is a fragmentary view of a modified form wherein the coupling member supports a release means;

Fig. 6 is an elevation of one of the parts shown in Fig. 5;

Fig. 7 is a view partly in section and partly in elevation, showing a modified form with the parts in coupled relation, the coupling member supporting a release means similar to that of Fig. 5, and illustrating a pencil for effecting disengagement;

Figs. 8 and 9 illustrate another modified form wherein no implement is required in disengaging the parts, Fig. 9 being an enlarged section on line 9—9 of Fig. 8;

Figs. 10 and 11 illustrate another modified form wherein no implement is required in disengaging the parts, Fig. 11 being an enlarged section on line 11—11 of Fig. 10;

Fig. 12 is a side elevation and Fig. 13 a section of another modified form;

Figs. 14 and 15 are side elevations of another modified form.

Referring to Figs. 1 to 4 of the drawing, the metallic sleeve or female member 1 is coupled to the pin or male member 2 by coupling member 3 as illustrated in Fig. 2. The member 3 preferably comprises a rigid element such as a piece of wire, whose free ends have barbs or points and are free to yield. No special effort need be made in preparing the points on the wire, because when the wire is cut from its strand, a sufficiently sharp point is left to serve the purpose. The lower portion of the pin 2 is tapered and provided with a hole 4 through which the wire is threaded, whereupon it may be bent substantially to the V-shape illustrated, wherein the crotch is given a U-shape before the free ends diverge. This assists in holding the wire erect, although the tapered walls of the pin may be slightly recessed, as at 5, if desired, for assisting in maintaining the coupling member 3 in position. If desired, the hole 4 may be dispensed with, and the wire fastened in a slot in the end of the pin as seen in Fig. 3, or the wire may be secured to the pin in the same manner as the coupling member in Fig. 8.

The distance between the free ends of the wire or coupling member 3 is slightly greater than the diameter of the sleeve 1, so that when the pin 2 is initially inserted into the sleeve 1, the free ends yield inwardly and are kept under tension by the sleeve. The pin may be inserted to any extent but upon exerting a pull, the pointed ends of coupling member 3, embed themselves and bite into the softer walls of the sleeve member thereby taking hold and gripping it against release. Obviously, the parts may be moved relative to each other for adjustment by pushing the pin further into the sleeve, but they cannot be retracted and separated in this form unless a tubular element such as 6 is employed.

In Fig. 4, the tube 6 has been inserted in sleeve 1 until it encounters the coupling member 3. Further insertion of tube 6 causes its walls to telescope the free ends of member 3 and to compress them thereby disengaging them from sleeve 1. In this manner, the male and female parts may be separated.

It will be seen in this form of the improvements that the coupling member is very easily anchored on the pin, requiring little skill or tool work. Furthermore, it does not have to be mounted immovably on the pin, since it will perform its functions, as long as it is maintained substantially upright. A further advantage resides in the fact that separation of the parts is facilitated. The tube 6 is inexpensive to manufacture and will disengage the parts irrespective of the relative positions of engagement between the tube 6 and the wire coupling member 3, since the former does not have to fit the latter like a special key. Accordingly, the three parts comprising the unit illustrated in Fig. 4, constitute a cheap but very efficient coupling and release unit.

Referring to the forms of Figs. 5 and 6, it will be seen that these embodiments may be disengaged by employing any elongated instrument, such as a pencil, nail, pen holder or the like. In Fig. 5, the coupling member 3 supports a release means which remains thereon as a part of pin 2, and is carried with it at all times. In the illustrated embodiment this release means 7 is in the form of a short tube having holes 8. In assembling these parts the tube 7 is slipped over the pin 2 and coupling 3. This causes the coupling to be compressed until the free ends come in register with holes 8, whereupon they spring through the holes and take their normal position, like that of Fig. 1, except that the tube 7 is supported on and carried by the coupling member 3. In Fig. 7, the pin structure is substantially the same, except that the tube 7a, is of greater diameter and surrounds the pin, whereas in Fig. 5, the tube 7 is of the same or less diameter than the pin. Upon inserting either of these forms in the sleeve 1, the free ends of the coupling member grip the walls of the sleeve in the same manner as in the forms of Figs. 1–4. As illustrated in Figs. 5 to 7, the lower ends of tubes 7 and 7a are crimped slightly, so as to provide a better contact surface for a releasing instrument.

To release the posts, in Figs. 5 and 7, an elongated instrument, such as a pencil 9 (see Fig. 7) may be thrust inwardly against tube 7 or 7a, whereupon the tube moves relative to the coupling 3 and the walls of the tube compress the free ends of the coupling until they are free of the sleeve 1. The male and female members are now separated and may be withdrawn from each other. Upon withdrawal of the pencil, the tube drops back and the coupling resumes its normal position with the tube 7 thereon.

Upon reference to Figs. 8 to 11, two embodiments are illustrated wherein no instrument or key of any character is required to release the parts. In these, and following modified forms, the coupling member comprises a yieldable steel ribbon 3a, although the wire 3 may be used with these forms with similar success. In the form of Figs. 8 and 9, the sleeve 1a is provided with as many grooves or recesses 12 as there are gripping points on the coupling member. In this embodiment, the member 3a has four points, spurs, or teeth and accordingly the sleeve 1a has four recesses or grooves 12. Said grooves or recesses extend longitudinally along the inner wall of the sleeve and are spaced from each other a distance equal to the space or distance between the points or teeth of the coupling 3a.

Furthermore, the distance between diametrically opposite points, such as A and B (Fig. 9) is greater than the diameter of the inner wall of sleeve 1a. Accordingly, when the pin 2a is brought up to the end of sleeve 1a in the position illustrated in Fig. 9, and then inserted therein, the coupling member will yield and will bite into the wall of the sleeve, after it comes to rest inside, as in the form previously described, thereby providing a tight grip. However, the distance between oppositely disposed recesses or grooves 12 is greater than the distance between diametrically opposite points A and B of coupling member 3a, so that when the four points of the latter are in the four grooves 12, the parts may be separated, since the points cannot grip the sleeve. Therefore, to release the pin 2a from the sleeve 1a, the former may be turned relative to the latter until the four points register with and rest in the four grooves, whereupon the parts may be pulled apart along their longitudinal axes. To facilitate this the pin is provided with a hex-head and a groove 13, to receive instruments, although the turning may be accomplished by hand. Manifestly, the assembly may be accomplished by inserting the pin in the sleeve, in a position when the points and grooves are in register and thereupon turning one relative to the other for effecting the grip. If preferred, the recesses or grooves may be bulged out of the walls of sleeve 1a, instead of reaming same, to reduce the cost of manufacture.

The form in Figs. 10 and 11 is similar to that of Figs. 8 and 9, except that the recesses or grooves are in the form of slots 12a. Otherwise the form, functions and results are the same.

In the embodiment illustrated in Figs. 12 and 13, the pin 2b takes the form of a hollow tubular member having opposed apertures 15. The coupling member 3a is disposed within the pin 2b with the free ends protruding through apertures 15 as illustrated. When assembled within a surrounding sleeve member, the grip on the walls is similar to that previously described. To disengage pin 2b from such surrounding sleeve member, any elongated instrument may be employed. For example, a pencil or nail may be inserted through the head 16 of the pin until it contacts the member 3a, whereupon further advance against said member will cause it to be moved relative to the pin, and the wall portions surrounding apertures 15 cause the free ends to be drawn inwardly until they are disengaged from the sleeve. However, the free ends should not be forced through the apertures.

Figs. 14 and 15 show an embodiment of the improvements wherein the pin 2c is provided with a conical screw threaded end adapted to be screwed into any softer material such as wood or the like. The opposite end is equipped with a coupling member such as 3 or 3a, for entering a metallic sleeve, or auger hole in wood for effecting a union between two pieces of wood or the like.

Further modifications may occur to those skilled in the art. For example, the coupling member may take various forms having one or more free ends and one or more points. Likewise, any form or type of sleeve may be employed without departing from the present improvements. Preferably the walls thereof should be of softer material than that of the coupling members, and in numerous instances auger holes in wood or the like may suffice in place of metallic sleeves. If it is desired to make the sleeve of Figures 10 and 11, of thin stock which might not be perfectly self-sustaining, the sleeve may be reinforced against spreading by disposing it in a hole where the surrounding material will prevent spreading of the sleeve. Where wire is used as a coupling member, it may be square in cross section, thereby lending itself more readily to maintenance in an erect position in a hole or slot, as desired. In the forms of Figs. 14 and 15, the threads may be hardened so as to cut their way into metals for uniting metal to metal or wood to metal, etc.

Various other modifications may be made without departing from the invention.

We claim:

1. A releasable fastening means comprising an open-ended tubular member and a member telescoped therein, a releasable coupling element mounted adjacent the end of the innermost member and having at least two spaced gripping members engaging the outer member, means for releasing the members comprising an annulus aligned end-wise with said inner member and carried by said gripping members and operable through the end of said outer member for engaging and moving said gripping members whereby said telescoped members are released.

2. A releasable fastening means comprising an open-ended tubular member and a member telescoped therein, a releasable coupling element mounted adjacent the end of the innermost member and having at least two spaced gripping members engaging the outer member, means for releasing the members comprising a tubular member aligned end-wise with said inner member and carried by said gripping members and operable through the end of said outer member for engaging and moving said gripping members whereby said telescoped members are released.

3. A releasable fastening means comprising an open-ended tubular member and a member telescoped therein, a releasable coupling element mounted adjacent the end of the innermost member and having at least two spaced gripping members engaging the outer member, means for releasing the members comprising a perforated tubular member aligned end-wise with the innermost member, said gripping members projecting through said perforations for supporting said last named tubular member, said perforated tubular member being operable through the end of said outermost member for engaging and moving said gripping members whereby said tubular members are released.

CHARLES W. HULL.
JOHN C. HAMILL.